United States Patent
Sarby et al.

(10) Patent No.: US 11,859,528 B2
(45) Date of Patent: Jan. 2, 2024

(54) EXHAUST GAS AFTERTREATMENT SYSTEM

(71) Applicant: Scania CV AB, Södertälje (SE)

(72) Inventors: Håkan Sarby, Huddinge (SE); Christer Lundberg, Rönninge (SE)

(73) Assignee: Scania CV AB, Södertälje (SE)

( * ) Notice: Subject to any disclaimer, the term of this patent is extended or adjusted under 35 U.S.C. 154(b) by 106 days.

(21) Appl. No.: 17/611,033

(22) PCT Filed: May 13, 2020

(86) PCT No.: PCT/SE2020/050487
§ 371 (c)(1),
(2) Date: Nov. 12, 2021

(87) PCT Pub. No.: WO2020/236065
PCT Pub. Date: Nov. 26, 2020

(65) Prior Publication Data
US 2022/0298943 A1    Sep. 22, 2022

(30) Foreign Application Priority Data
May 20, 2019   (SE) .................................. 1950598-1

(51) Int. Cl.
| | | |
|---|---|---|
| *F01N 3/10* | (2006.01) | |
| *F01N 3/20* | (2006.01) | |
| *F01N 13/00* | (2010.01) | |
| *B01D 53/94* | (2006.01) | |

(52) U.S. Cl.
CPC ......... *F01N 3/208* (2013.01); *B01D 53/9418* (2013.01); *B01D 53/9431* (2013.01); *B01D 53/9477* (2013.01); *B01D 53/9495* (2013.01); *F01N 3/106* (2013.01); *F01N 13/008* (2013.01); *F01N 13/009* (2014.06); *F01N 2610/146* (2013.01); *F01N 2610/148* (2013.01); *F01N 2900/0408* (2013.01); *F01N 2900/1402* (2013.01); *F01N 2900/1602* (2013.01)

(58) Field of Classification Search
CPC ........ F01N 3/208; F01N 3/106; F01N 13/008; F01N 13/009; F01N 2610/146; F01N 2610/148; F01N 2900/0408; F01N 2900/1402; F01N 2900/1602; B01D 53/9418; B01D 53/9431; B01D 53/9477; B01D 53/9495; G05B 1/00; G05B 6/00; G05B 13/00
See application file for complete search history.

(56) References Cited

U.S. PATENT DOCUMENTS

| 8,132,403 | B2 | 3/2012 | Toshioka et al. |
|---|---|---|---|
| 2009/0272101 | A1 | 11/2009 | Wills et al. |
| 2010/0101215 | A1 | 4/2010 | Wu et al. |
| 2010/0223907 | A1 | 9/2010 | Walde et al. |
| 2010/0242454 | A1 | 9/2010 | Holderbaum |
| 2011/0083429 | A1 | 4/2011 | Sato et al. |
| 2011/0265452 | A1* | 11/2011 | Geveci .................... F01N 3/208 60/274 |
| 2012/0055139 | A1 | 3/2012 | Aichhorn |
| 2012/0137657 | A1 | 6/2012 | Dahl et al. |
| 2013/0232958 | A1 | 9/2013 | Ancimer et al. |
| 2015/0093311 | A1 | 4/2015 | Stenls |
| 2017/0122159 | A1 | 5/2017 | Bahrami |
| 2018/0106179 | A1* | 4/2018 | Zhao ....................... F01N 11/00 |
| 2019/0010884 | A1* | 1/2019 | Quigley .............. F02D 41/1441 |

FOREIGN PATENT DOCUMENTS

| CN | 101646846 A | 2/2010 |
|---|---|---|
| CN | 101907012 A | 12/2010 |
| CN | 102449279 A | 5/2012 |
| EP | 2143901 A1 | 1/2010 |
| EP | 2541011 A1 | 1/2013 |
| EP | 2885514 A1 | 6/2015 |
| EP | 3064727 A1 | 9/2016 |
| WO | 2009135062 A2 | 11/2009 |
| WO | 2013165309 A1 | 11/2013 |
| WO | 2018197742 A1 | 11/2018 |

OTHER PUBLICATIONS

SCANIA CV AB, International Patent Application No. PCT/SE2020/050487, International Search Report, dated May 26, 2020.
SCANIA CV AB, International Patent Application No. PCT/SE2020/050487, Written Opinion, dated May 26, 2020.
SCANIA CV AB, Swedish Patent Application No. 1950598-1, Office Action, dated Dec. 6, 2019.
SCANIA CV AB, International Patent Application No. PCT/SE2020/050487, International Preliminary Report on Patentability, dated Nov. 16, 2021.
SCANIA CV AB, Chinese Patent Application No. 2020800271702, First Office Action, dated Feb. 17, 2023.
SCANIA CV AB, European Patent Application No. 20810774.8, Extended European Search Report, dated May 3, 2021.

\* cited by examiner

*Primary Examiner* — Timothy C Vanoy
(74) *Attorney, Agent, or Firm* — Moore & Van Allen PLLC; W. Kevin Ransom (57) ABSTRACT

The present disclosure relates to an exhaust gas aftertreatment system and method for controlling same. The exhaust gas aftertreatment system comprises: a reductant dosing device; a selective catalytic reduction device arranged downstream of the reductant dosing device; an ammonia slip catalyst arranged downstream of the SCR device; a feedback NOx sensor arranged downstream of the SCR device and upstream of the ammonia slip catalyst; a tailpipe NOx sensor arranged downstream of the ammonia slip catalyst; and a control device configured for: providing an initial dosing of reductant from the reductant dosing device; obtaining a feedback signal from the feedback NOx sensor and a tailpipe NOx signal from the tailpipe NOx sensor; and adjusting the dosing of reductant until the feedback signal exceeds the tailpipe NOx signal by a value within a predetermined positive interval.

13 Claims, 5 Drawing Sheets

EXHAUST GAS AFTERTREATMENT SYSTEM

CROSS-REFERENCE TO RELATED APPLICATIONS

This application is a National Stage Patent Application (filed under 35 § U.S.C. 371) of PCT/SE2020/050487, filed May 13, 2020 of the same title, which, in turn claims priority to Swedish Patent Application No. 1950598-1 filed May 20, 2019 of the same title; the contents of each of which are hereby incorporated by reference.

FIELD OF THE INVENTION

The present invention relates to exhaust gas aftertreatment systems, methods for controlling such systems, and vehicles comprising such systems.

BACKGROUND OF THE INVENTION

Emissions standards for motor vehicles are becoming increasingly stringent. Such standards typically specify maximum emission levels for a number of tailpipe pollutants including carbon monoxide (CO), hydrocarbons (HC), nitrogen oxides (NOx) and particulate matter (PM). In order to meet the requirements of the present and presumably future standards, vehicles are required to be equipped with emissions reduction technologies. Such emissions reduction technologies suitable for diesel vehicles include exhaust gas recirculation (EGR), particulate filters, diesel oxidation catalysts (DOC), and selective catalytic reduction (SCR). Each technology has its own distinct advantages and disadvantages, and may increase the incidence of one pollutant while reducing the incidence of another. For example, EGR may reduce NOx emissions, but reduce fuel efficiency and increase particulate matter. Therefore, a number of technologies are commonly applied together in order to meet emissions standards.

Selective catalytic reduction (SCR) is an effective technology to reduce tailpipe nitrogen oxides (NOx) emissions. It involves adding a reductant, such as ammonia, to the vehicle exhaust stream. The reductant, with the aid of a catalyst, reduces NOx in the exhaust stream to nitrogen gas ($N_2$) and water. In practical implementations in motor vehicles, an aqueous urea solution is typically used as a reductant and this urea solution is decomposed to ammonia and carbon dioxide in the hot exhaust stream.

Since SCR is implemented downstream of the engine as an exhaust aftertreatment, it does not affect the combustion performance of the engine in the same manner as for example EGR does. Therefore, it is desirable to be able to remove substantially all NOx from the exhaust stream using only SCR, without the need for EGR. However, this is not without difficulties. In order to produce the quantities of ammonia required to reduce substantially all NOx, large quantities of urea solution must be injected into the exhaust stream.

In order to control urea dosing and avoid over- or under-dosing of reductant, NOx sensors are typically utilized in the aftertreatment system. For example, a NOx sensor may be used to measure NOx of the exhaust stream upon leaving the engine, and a further NOx sensor may be arranged downstream of the SCR catalyst. Presently available NOx sensors are non-selective and cannot differentiate between NOx and $NH_3$. Therefore, the NOx sensor arranged downstream of the SCR catalyst is also typically arranged downstream of an ammonia slip catalyst. The ammonia slip catalyst removes excess ammonia by conversion to nitrogen gas. By arranging the NOx sensor downstream of the ammonia slip catalyst it is thus ensured that the NOx sensor is actually measuring tailpipe NOx and not ammonia slip.

Measuring accuracy for NOx sensors is in the order of 0.1 g/kWh. In order to meet current emission standards (e.g. Euro 6), tailpipe NOx needs to be about 0.25 g/kWh or less, in warm operation. Therefore, urea dosing can be performed using feedback control from the NOx sensors in order to achieve the 0.25 g/kWh limit. However, with potential future emissions standards, such as CARB23, tailpipe NOx will potentially have to be below 0.1 g/kWh in warm operation. This is below the measuring accuracy of presently available NOx sensors, and thus feedback NOx control cannot be used for systems looking to meet future emissions requirements.

One possible solution to this problem is to consistently over-dose reductant by a large margin, i.e. consistently have an ammonia:NOx ratio (ANR) much greater than 1, such as 1.5 or greater. However, this is undesirable due to the economic cost of excess reductant. Moreover, over-dosing of ammonia leads to ammonia slip, i.e. unreacted ammonia passing beyond the SCR catalyst. An ammonia slip catalyst is typically provided in the aftertreatment system to take care of this ammonia slip and prevent ammonia tailpipe emission. However a proportion of the ammonia slip is converted to $N_2O$ in the ammonia slip catalyst. $N_2O$ is a strong greenhouse gas and is regulated in a number of present emissions standards. A greater overdosing of ammonia will lead to increased emissions of $N_2O$, and therefore for this reason over-dosing of ammonia is preferably avoided.

There remains a need for improved exhaust aftertreatment systems in order to meet the requirements of future emissions standards.

SUMMARY OF THE INVENTION

The inventor of the present invention has recognized a number of shortcomings with the known art. The placement of the tailpipe NOx sensor in existing exhaust gas aftertreatment systems is non-optimal since in order to meet future emission requirements NOx levels at the point of sensor placement will have to be below the level that can be reliably measured by the NOx sensor. This means that the tailpipe NOx sensor cannot be used in feedback control of urea dosing. Because ammonia slip catalysts typically have some SCR functionality and SCR catalysts are less than 100% effective, somewhat greater NOx concentrations may prevail upstream of the ammonia slip catalyst. However, due to the non-selectivity of the NOx sensor and potential presence of ammonia slip at this location, any NOx values measured at this location cannot be relied upon. Consistent over-dosing of reductant to the SCR system can be utilized to meet emission requirements regarding NOx. This however is at the cost of greater $N_2O$ emissions and excessive reductant consumption.

It would be advantageous to achieve an exhaust aftertreatment system overcoming, or at least alleviating, at least some of the above mentioned challenges. In particular, it would be desirable to provide an exhaust aftertreatment system allowing for feedback control of reductant dosing whilst still meeting future stringent emission standards with regards to NOx and potentially $N_2O$.

According to a first aspect of the invention, the object of the invention is achieved by a method for controlling an exhaust gas aftertreatment system according to the appended independent claims.

The exhaust gas aftertreatment system comprises: a reductant dosing device; a selective catalytic reduction (SCR) device arranged downstream of the reductant dosing device; an ammonia slip catalyst arranged downstream of the SCR device; a feedback NOx sensor arranged downstream of the SCR device and upstream of the ammonia slip catalyst; and a tailpipe NOx sensor arranged downstream of the ammonia slip catalyst.

The method is performed by a control device and comprises the steps of:
  providing an initial dosing of reductant from the reductant dosing device;
  obtaining a feedback signal from the feedback NOx sensor and a tailpipe NOx signal from the tailpipe NOx sensor; and
  adjusting the dosing of reductant until the feedback signal exceeds the tailpipe NOx signal by a value within a predetermined positive interval.

By utilizing the signal from a feedback NOx sensor arranged between the SCR and ASC, as well as the signal from a tailpipe NOx sensor, the dosing of reductant can be accurately feedback controlled to permit sufficient overdosing of ammonia such that NOx emission levels are below the levels detectable by the tailpipe NOx sensor (<0.1 g/KWh), and little $N_2O$ is emitted (<0.1 g/KWh). This is done by using the feedback and tailpipe sensor signals in combination to determine whether the feedback sensor is detecting NOx, ammonia, or a combination of both. At low ammonia:NOx ratios (ANR) the feedback sensor will be subjected to essentially only NOx and the tailpipe sensor will be subjected to more-or-less the same levels of NOx meaning there will be little difference between the feedback and tailpipe sensor signals. At high ammonia:NOx ratios the feedback sensor will be subjected to essentially only ammonia. Since the ammonia slip catalyst removes this ammonia, the tailpipe sensor will not be subjected the same levels of ammonia meaning there will be a large difference between the feedback and tailpipe sensor signals. The method uses the signals of the feedback and tailpipe sensor to adjust the dosing of reductant such that a sufficiently large excess of ammonia prevails at the feedback sensor.

By positive interval it is meant that the feedback signal value should be greater than the tailpipe NOx signal, and therefore the desired difference between these signals should be a positive value. The predetermined positive interval may for example correspond to an ammonia concentration of from about 0.2 g/kWh to about 0.5 g/kWh at the feedback sensor.

The step of adjusting the dosing of reductant may comprise the steps of
  determining a difference (A) between the feedback signal and the tailpipe NOx signal; and
  comparing the determined difference (A) with a lower boundary difference value and an upper boundary difference value.

The dosing of reductant is then increased if the determined difference is below the lower boundary difference value, or the dosing of reductant is decreased if the determined difference is above the upper boundary difference value.

This provides a simple means of adjusting the dosing of reductant until the feedback signal exceeds the tailpipe NOx signal by a value within a predetermined positive interval.

Alternatively, the step of adjusting the dosing of reductant may comprise the steps of
  comparing the tailpipe NOx signal with a threshold tailpipe NOx value, whereby if the tailpipe NOx signal is greater than a threshold tailpipe NOx value then the dosing of reductant is increased in order to obtain a tailpipe NOx signal less than the threshold tailpipe NOx value; and
  once the tailpipe NOx signal is less than the threshold tailpipe NOx value then comparing the feedback signal with a lower boundary value and an upper boundary value.

The dosing of reductant is then increased if the feedback signal is below the lower boundary value, or the dosing of reductant is decreased if the feedback signal is above the upper boundary value.

This allows the use of prior art methods of regulating dosing at low ANR using the tailpipe NOx sensor, and requires input of the additional feedback sensor only once it is established that the aftertreatment system is operating in a high ANR regime where the tailpipe sensor can no longer effectively steer dosing by itself. The threshold tailpipe NOx value may for example be equal to the detection limit of the tailpipe NOx sensor, or alternatively may not exceed the detection limit of the tailpipe NOx sensor by more than 10%. This ensures that the dosing may be controlled to as great an extent as possible using prior art methods of feedback control with the tailpipe NOx signal, before transitioning to feedback control using the feedback NOx sensor.

The exhaust gas aftertreatment system may further comprise an initial NOx sensor arranged upstream of the reductant dosing device. In such a case, the initial dosing of reductant from the reductant dosing device may be provided based on an initial NOx signal from the initial NOx sensor. Use of an initial NOx sensor typically allows for relatively accurate initial dosing corresponding to an ANR within the interval 0.8 to 1.2, and means that the system is more responsive to changes in the exhaust conditions.

The exhaust gas aftertreatment system may further comprise a temperature sensor. The temperature sensor may be used to measure the temperature prevailing in the aftertreatment system in order to control when the method is applied. The method may be performed at a temperature of 150° C. or greater, such as 180° C. or greater, or 200° C. or greater, as measured by a temperature sensor located in the aftertreatment system. The method is predicated on the assumption that urea dosed to the aftertreatment system is converted to ammonia, and this assumption holds true for temperatures in excess of approximately 150° C.

The tailpipe NOx signal and/or the feedback signal may be time averaged. This allows for the method to account for transient peaks or dips in ammonia slip caused for example by transient temperature changes to the SCR device.

According to another aspect of the invention, the objects of the invention are achieved by an exhaust gas aftertreatment system according to the appended independent claims. The exhaust gas aftertreatment system comprises:
  a reductant dosing device;
  a selective catalytic reduction (SCR) device arranged downstream of the reductant dosing device;
  an ammonia slip catalyst arranged downstream of the SCR device;
  a feedback NOx sensor arranged downstream of the SCR device and upstream of the ammonia slip catalyst;
  a tailpipe NOx sensor arranged downstream of the ammonia slip catalyst; and a control device configured to perform the method described herein.

The ammonia slip catalyst may have both ASC and SCR functionality. This may permit a further lowering of NOx emissions or permit the use of a lesser-dimensioned and cheaper SCR device.

According to a further aspect of the present invention, the object of the invention is obtained by a vehicle comprising an exhaust gas aftertreatment system as described herein.

Further objects, advantages and novel features of the present invention will become apparent to one skilled in the art from the following detailed description.

BRIEF DESCRIPTION OF THE DRAWINGS

For a fuller understanding of the present invention and further objects and advantages of it, the detailed description set out below should be read together with the accompanying drawings, in which the same reference notations denote similar items in the various diagrams, and in which.

DETAILED DESCRIPTION OF THE INVENTION

The present invention concerns a method for controlling an exhaust gas aftertreatment system in order to reduce tailpipe NOx emissions below levels reliably detectable by current NOx sensors. The invention is based upon a realization by the inventors that the non-selectivity of NOx sensors could be exploited to ensure that a suitable level of over-dosing of ammonia is provided using feedback control, thus allowing tailpipe NOx emission levels to be obtained that are below the levels detectable by current NOx sensors. This is feasible as long as it is possible to determine whether a NOx sensor located downstream of the SCR catalyst is operating in a NOx-rich environment (sub-stoichiometric dosing of ammonia to SCR) or an ammonia-rich environment (over-stoichiometric dosing of ammonia to SCR). A tailpipe NOx sensor arranged downstream of the ammonia slip catalyst enables such a determination in combination with a feedback NOx sensor arranged downstream of the SCR device and upstream of the ammonia slip catalyst.

The exhaust gas aftertreatment system comprises a reductant dosing device, a selective catalytic reduction (SCR) device, an ammonia slip catalyst and a plurality of NOx sensors. The relation of aftertreatment system components to each other will in this application be defined in terms of upstream and downstream. Upstream and downstream respectively refer to positions in the exhaust aftertreatment system with reference to the typical direction of flow of exhaust gas from the engine to the tailpipe. A component is designated upstream of another if it is located in the exhaust system closer to the engine, whereas it is designated downstream if it is located in the exhaust system closer to the tailpipe.

The reductant dosing device is arranged to dose reductant to the exhaust gas aftertreatment system. To this end, the reductant dosing device may comprise or consist of at least one reductant injector. The reductant injector may be of any type known in the art, such as an air-assisted (e.g. jetspray) injector, or a liquid-only (i.e. airless) injector.

The reductant may be any SCR reductant known in the art. The reductant is preferably diesel exhaust fluid comprising a solution of urea in water, in accordance with standard AUS 32 of ISO 22241, due to its widespread commercial availability and easy handling. However, other reductants such as aqueous ammonia solution or guanidinium salt solutions may also be used where appropriate.

The SCR device is arranged downstream of the reductant dosing device. The SCR device may be of any type known in the art. By SCR device, it is meant a device comprising a catalyst capable of catalysing the reduction of NOx to N$_2$ using the reductant. The SCR catalyst device may be a dedicated SCR catalyst, or it may be a device combining the function of an SCR catalyst with another function. For example, the SCR device may be an SCR-catalysed diesel particulate filter (SDPF). The SCR device may comprise multiple SCR catalysts arranged in parallel or series.

Selective catalytic reduction (SCR) is used to convert nitrogen oxides (NOx) to benign nitrogen gas (N$_2$), typically using ammonia as the reductant. The dominant reactions in ammonia SCR are:

It can be seen from these reactions that the optimal stoichiometry of NH$_3$ to NOx is approximately 1:1, i.e. an ammonia:NOx ratio (ANR) of about approximately 1. Therefore, an ANR greater than stoichiometric (over-stoichiometric) may be about 1.1 or greater, such as about 1.2 or about 1.3. An ANR less than stoichiometric (sub-stoichiometric) may be less than or equal to 1, such as less than or equal to 0.9. Sub-stoichiometric dosing of ammonia leads to incomplete conversion of NOx, i.e. NOx detectable at the outlet of the SCR device, whereas over-dosing of ammonia leads to ammonia slip, i.e. unreacted ammonia detectable at the outlet of the SCR device.

An ammonia slip catalyst is arranged downstream of the SCR device. Ammonia slip catalysts prevent tailpipe ammonia emissions by oxidation of excess ammonia to benign nitrogen gas (N$_2$). However, this catalytic reaction is not fully selective and a proportion of ammonia slip is unavoidably converted to N$_2$O in the catalyst. N$_2$O is a strong greenhouse gas and its emission is highly undesirable. Therefore it is desired to limit the over-stoichiometric dosing of ammonia to a level whereby substantially all NOx is converted but no more, in order to limit production of N$_2$O. Appropriate ANR values may for example be from about 1.05 to about 1.3, such as from about 1.1 to about 1.2. When using over-stoichiometric ammonia:NOx ratios it is advantageous if the ammonia slip catalyst also possesses SCR functionality, since in this manner it may assist in further reducing NOx emission levels or permit use of a smaller-dimensioned SCR catalyst.

The exhaust aftertreatment system comprises at least two NOx sensors, preferably three or more NOx sensors. The NOx sensors may be any type known in the art, such as the commercially available YSZ-type NOx sensors. Commercially available NOx sensors are typically not fully selective for NOX and also detect ammonia ($NH_3$).

A NOx sensor is arranged in the exhaust aftertreatment system downstream of the ammonia slip catalyst, and is herein termed the tailpipe NOx sensor. Note however that this sensor may be located anywhere in the aftertreatment system downstream of the ASC and is not necessarily located in a tailpipe of the exhaust system.

A further NOx sensor is arranged between the SCR and the ASC, downstream of the SCR and upstream of the ASC. This NOx sensor is herein termed the feedback sensor since feedback from this sensor is used to achieve ANR values within a desired interval.

Optionally, a NOx sensor may be arranged upstream of the reductant dosing device. This sensor is herein termed the initial NOx sensor and may be used in conjunction with exhaust flow data (either virtual or measured by flow sensor) in order to determine a suitable initial dosing rate of reductant.

The exhaust aftertreatment system may comprise further components as commonly known in the art. For example, a diesel oxidation catalyst (DOC) and/or diesel particulate filter (DPF), or combined DOC/DPF may be arranged upstream of the reductant distribution arrangement. A pre-SCR unit comprising a reductant dosing device and SCR catalyst may be arranged upstream of the DOC in order to remove a proportion of exhaust NOx prior to the exhaust gas reaching the main SCR device as described herein. A mixer or evaporation plate may be arranged in conjunction with the reductant dosing device in order to improve the distribution of reductant in the exhaust stream. Further sensors, such as temperature sensors, flow sensors, and/or pressure sensors may be arranged as suitable in the aftertreatment system.

The exhaust aftertreatment system may comprise a control device configured to perform the method as described herein. Alternatively, or in addition, the exhaust aftertreatment system may in use be arranged in communication with another suitable control device for performing the method described herein.

The inventive method will now be described in more detail with reference to certain exemplifying embodiments and the drawings. However, the invention is not limited to the exemplifying embodiments discussed herein and/or shown in the drawings, but may be varied within the scope of the appended claims. Furthermore, the drawings shall not be considered drawn to scale as some features may be exaggerated in order to more clearly illustrate certain features.

Figure 1:
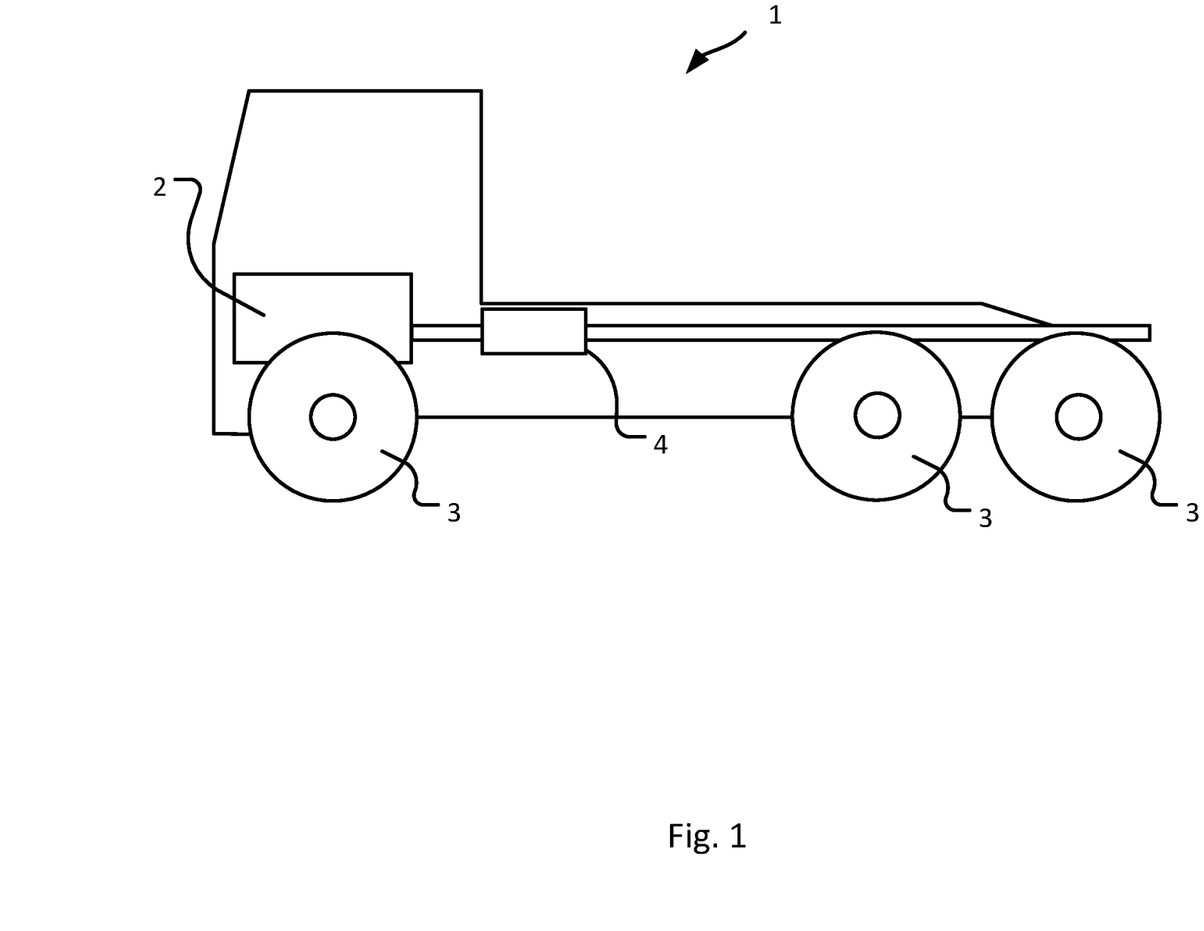
FIG. 1 schematically illustrates a vehicle comprising an exhaust gas aftertreatment system.

FIG. 1 depicts a vehicle 1, here in the form of a truck, in a schematic side view. The vehicle may however be any other motor driven vehicle, for example a bus, a watercraft, or a passenger car. The vehicle comprises a combustion engine 2 which powers the vehicle's tractive wheels 3 via a gearbox (not shown) and a drive shaft (not shown). The vehicle is provided with an exhaust gas aftertreatment system 4 for treating exhaust gases expelled by the engine 2.

Figure 2:
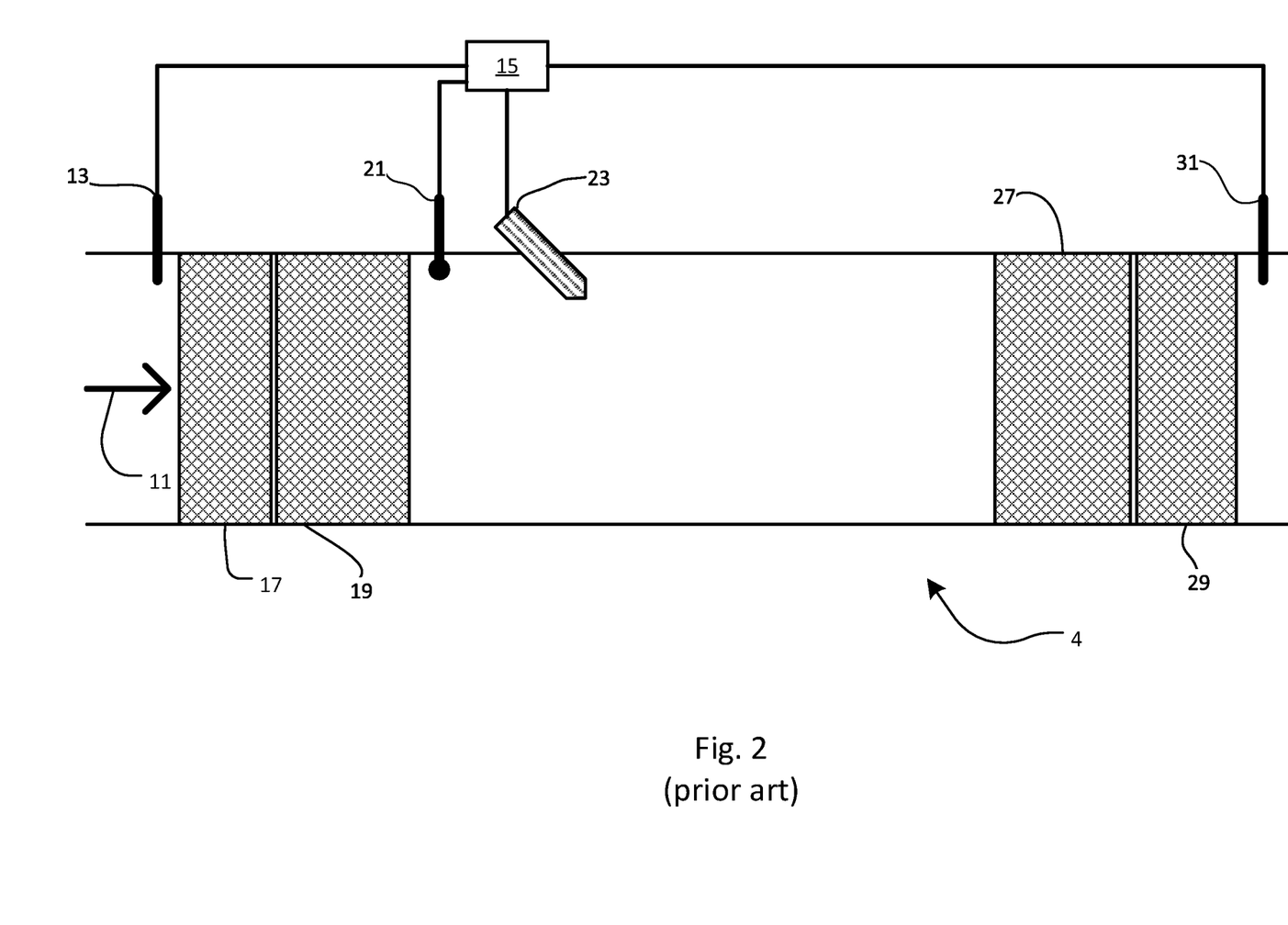
FIG. 2 schematically illustrates an exhaust gas aftertreatment system according to the prior art.

FIG. 2 schematically illustrates an exhaust aftertreatment system 4 as known in the prior art. An arrow 11 indicates the direction of exhaust flow. The terms "downstream" and "upstream" are used with reference to the direction of exhaust flow as indicated by arrow 11. The system comprises an initial NOx sensor 13. The initial NOx sensor is connected to a control device 15. Downstream of the initial NOx sensor 13 a diesel oxidation catalyst (DOC) 17 and diesel particulate filter (DPF) 19 are arranged in series. Downstream of the DOC 17 and DPF 19, a dosing device 23 is arranged to introduce urea into the aftertreatment system. A temperature sensor 21 is arranged downstream of the DPF 19 and upstream the dosing device 23. The dosing device 23 is connected to control device 15. Downstream of the dosing device 23 an SCR device 27 is arranged, and immediately downstream of the SCR device 27 an ammonia slip catalyst (ASC) 29 is arranged. A tailpipe NOx sensor 31 is arranged downstream of the ASC 29 and is connected to control device 15.

In operation, urea solution is dosed to the prior art exhaust aftertreatment system with the aim of achieving as uniform distribution of reductant as possible at the SCR device 27. An exhaust gas temperature of approximately at least 150° C. (e.g. about at least 180° C. or about at least 200° C.) is required to be able to evaporate the dosed urea and produce $NH_3$. The exhaust gas temperature may be measured using temperature sensor 21. Dosing is controlled by the control device 15, based on the signal from NOx sensors 13, 31, together with other inputs such as for example exhaust gas temperature and/or exhaust flow (measured or calculated). The urea decomposes to ammonia and is conveyed to the SCR device 27. The SCR device 27 catalyses the reaction of the ammonia with NOx present in the exhaust stream. At the outlet of the SCR device 27 a relatively uniform exhaust stream comprising a mixture of NOx and some ammonia slip is obtained. This exhaust stream is conveyed further to the ASC 29 where some further NOx may be removed by SCR and the remaining ammonia is oxidized to nitrogen. The exhaust stream exiting the ASC 29 comprises residual NOx and essentially no ammonia. Initial dosing of reductant is determined by the NOx concentration measured at the initial NOx sensor 13 together with exhaust flow data (either virtual or from a flow sensor). Due to limits in the measuring accuracy of NOx and exhaust flow, as well as variation in the dosing accuracy from dosing device 23, and variation in ambient conditions (ambient temperature, pressure and humidity), the initial dosing typically falls within the range of from about 0.8 to about 1.2 ANR. The tailpipe NOx sensor 31 detects residual NOx levels and is used in feedback control of urea dosing from dosing device 23 in order to obtain an ANR suitable for near-complete removal of NOx (typically from about 1.05 to about 1.1). Such prior art arrangements work satisfactorily as long as the residual NOx level is permitted to be above the limit reliably measurable by the tailpipe NOx sensor 31, which is approximately 0.1 g/kWh. However, if the permitted NOx emission is below the limit that may reliably be measurable by the tailpipe NOx sensor 31, the tailpipe sensor 31 cannot be used to control dosing of urea from dosing device 23.

Figure 3:
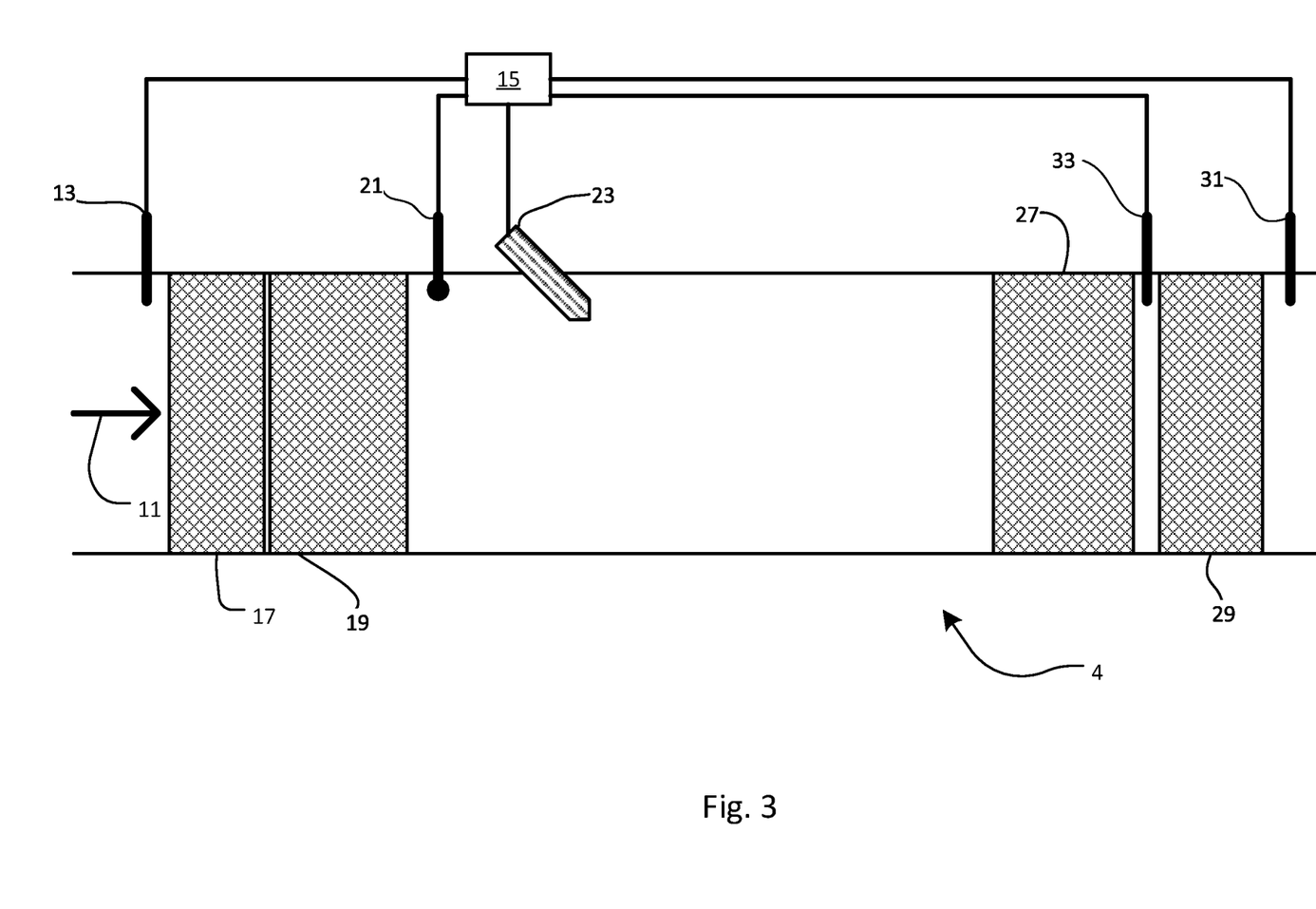
FIG. 3 schematically illustrates an exhaust gas aftertreatment system according to present invention.

FIG. 3 schematically illustrates an exemplifying embodiment of an exhaust gas aftertreatment system 4 according to the present invention. The exhaust gas aftertreatment system resembles the prior art system as illustrated in FIG. 2, however with an important difference. A feedback NOx sensor 33 is arranged downstream of the SCR device 27 and upstream of the ASC 29. This feedback NOx sensor 33 permits feedback control of reductant dosing when used in combination with data from the tailpipe sensor 31.

Figure 4:
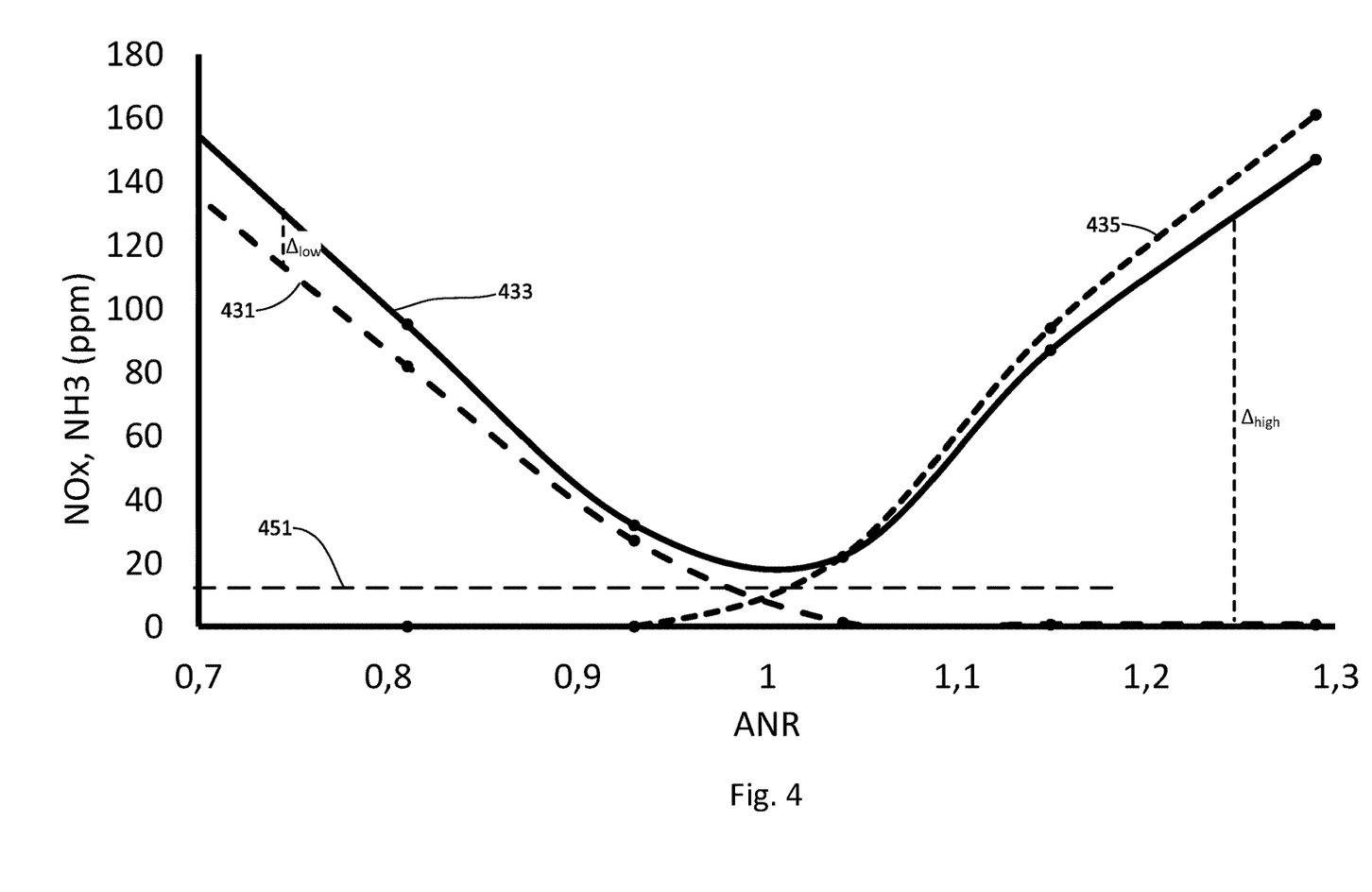
FIG. 4 is a chart schematically illustrating NOx, NH$_3$ and NOx-sensor output at the outlet of an SCR catalyst across a range of ammonia:NOx ratios (ANR)

FIG. 4 is a chart schematically illustrating NOx concentration (line 431) and ammonia concentration (line 435) as a function of ammonia:NOx ratio (ANR) at the outlet of an SCR device. The concentrations are given in ppm and were obtained under steady-state operating conditions at 300° C. The chart also shows the reading obtained from a NOx sensor arranged at the outlet of the SCR device (line 433), which is equivalent to the feedback NOx sensor 33 in the exhaust aftertreatment system according to the invention.

The chart illustrated in FIG. 4 can be used to understand the operation principles of the exhaust aftertreatment system.

At low ANR values (<0.95) it can be seen that significant quantities of NOx escape the SCR device (line 431), but there is essentially no ammonia slip (line 435). At these ANR values, the reading from the feedback NOx sensor (line 433) therefore essentially corresponds to the NOx concentration at the SCR device outlet. At high ANR values (ANR>1.05) it can be seen that essentially no NOx escapes the SCR device (line 431), but that significant quantities of ammonia slip are produced (line 435). As previously stated, NOx sensors are non-selective, meaning that they cannot distinguish between NOx and ammonia slip. At high ANR values, the reading from the feedback NOx sensor (line 433) therefore essentially corresponds to the ammonia slip concentration at the SCR device outlet. In a transitional ANR range (between approx. ANR 0.95-1.05) there is incomplete reaction of ammonia with NOx, meaning that both NOX emission (line 431) and ammonia slip (line 435) are detected at the SCR device outlet. In such a transitional case, the feedback NOx sensor measures the combined concentration of NOx and ammonia (line 433).

It can be seen from the chart in FIG. 4 that the feedback NOx sensor 33 cannot alone be used to control reductant dosing in order to achieve a desirable ammonia:NOx ratio (ANR). This is because the feedback NOx sensor output signal curve (line 433) on sweeping from low ANR values to high ANR values is essentially a symmetrical U-shape, with a minimum around ANR of approximately 1. This means that the feedback NOx sensor gives more-or-less the same output for a low ANR value as for a high ANR value (compare for instance ANR 0.8 with ANR 1.2). Note also that in real-life operation exhaust parameters such as temperature, flow and NOx concentration fluctuate, meaning that the gradient of the feedback sensor curve cannot be measured and used to determine whether the aftertreatment system is operating in the low-ANR or the high-ANR regime.

Line 451 illustrates a typical detection limit for an automotive NOx sensor, and it can be seen that at high ANR values the NOx concentration is lower than the concentration measurable with an automotive NOx sensor. This means that it is not possible to control ANR at high ANR values using only a tailpipe NOx sensor.

The solution to this problem is to use a feedback NOx sensor 33 in combination with a tailpipe NOx sensor 31 in order to establish whether the exhaust aftertreatment system is operating in a low-ANR regime or a high-ANR regime and provide feedback control of the reductant dosing in order to steer ANR to the desired interval of values (ANR 1.05-1.3, preferably 1.1-1.2). Since tailpipe sensor 31 is arranged downstream of the ASC 29, it is not subjected to ammonia slip, and therefore the signal from tailpipe sensor 31 essentially corresponds to the NOx curve as illustrated in line 431 of FIG. 4. From the chart in FIG. 4 it can be seen that there are a number of ways in which the signals from feedback NOx sensor 433 and tailpipe NOx sensor 431 may be used to control ammonia dosing in order to achieve an ANR within the desired interval. All of these ways have in common that the dosing of reductant is adjusted in some manner until the feedback signal exceeds the tailpipe NOx signal by a value within a predetermined positive interval. For example, it may be desirable to adjust dosing such that the feedback signal exceeds the tailpipe NOx signal by a value within an interval corresponding to from about 0.2 to about 0.5 g/kWh (about 20-50 ppm) of ammonia. Controlling dosing to provide such an excess of ammonia will lead to NOx emissions lower than 0.05 g/kWh, as well as very low $N_2O$ emissions.

The first manner in which this may be done is through a simple comparison of the signals of the feedback NOx sensor 31 and the tailpipe NOx sensor 33. It can be seen from FIG. 4 that at low ANR values the difference between the signals from these sensors is negligible ($\Delta_{low}$), since both sensors are measuring the same NOx emission, whereas at high ANR values the difference in the sensor signal is large ($\Delta_{high}$), since feedback NOx sensor 33 is detecting significant amounts of ammonia slip, whereas tailpipe NOx sensor is arranged downstream of the ASC 29 and therefore does not detect this slip. Therefore, a first means of controlling the ammonia dosing is by determining the difference in signal output between feedback NOx sensor 31 and tailpipe NOx sensor 33 ($\Delta$). If this difference is less than a lower boundary for the difference then ammonia dosing should be increased (e.g. if $\Delta$<30 ppm then increase ammonia dosing), whereas if it is greater than an upper boundary for the difference then ammonia dosing should be decreased (e.g. if $\Delta$>100 ppm then decrease ammonia dosing).

Figure 5:
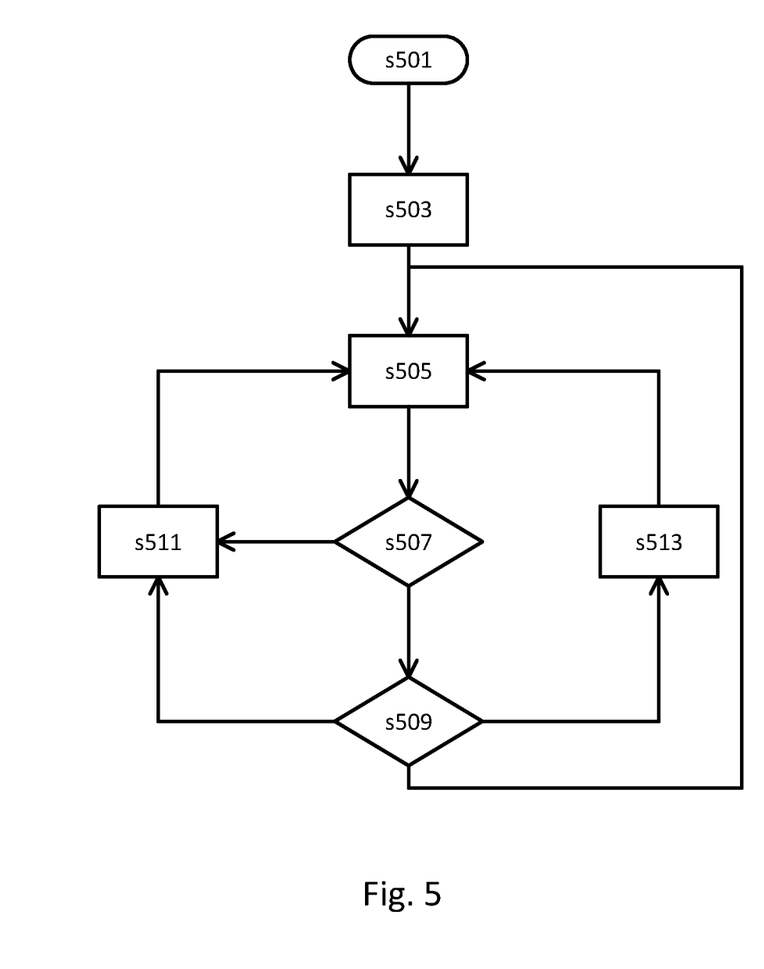
FIG. 5 is a flowchart schematically illustrating an exemplifying embodiment of a method for controlling an exhaust gas aftertreatment system according to the invention.

FIG. 5 is a flowchart illustrating an exemplifying embodiment of this first method of controlling the exhaust gas aftertreatment system. Step s501 denotes the start of the method. In step s503 an initial dosing of reductant is dosed from the reductant dosing device 23. This initial dosing may be based on a signal from the initial NOx sensor 13, or may be determined in some other manner. In step s505 a feedback signal is obtained from the feedback NOx sensor 31 and a tailpipe NOx signal is obtained from the tailpipe NOx sensor 33. In step s507 the difference ($\Delta$) is determined between the feedback signal and the tailpipe NOx signal. In step s509 the determined difference ($\Delta$) is compared with a lower boundary difference value and an upper boundary difference value. If the determined difference is lower than the lower boundary value then dosing is increased (s511) and the method returns again to step s505 of obtaining the tailpipe and feedback signals. If the determined difference is higher than the upper boundary value then dosing is decreased (s513) and the method returns again to step s505 of obtaining the tailpipe and feedback signals. If the determined difference is within the boundary values then the initial dosing is maintained and the method returns directly to step s505 of obtaining the tailpipe and feedback signals.

A second manner in which the exhaust aftertreatment system may be controlled is by first establishing that the tailpipe NOx sensor 31 has a signal lower than a threshold value. The threshold value may for example be the detection limit of the sensor (e.g. line 451 in FIG. 4), or at least a value in proximity to the detection limit of the sensor (e.g. 5% to 10% above the detection limit). If the signal of the tailpipe NOx sensor exceeds this threshold value, ammonia dosing should be increased until the signal of the tailpipe NOx sensor is less than this threshold. Once this condition is fulfilled, it is established that the exhaust aftertreatment system is operating in the high-ANR region, and the ammonia dosing may be controlled using the feedback signal from feedback NOx sensor 31 to steer the ANR to the desired interval. If the feedback signal is below a lower boundary value (e.g. 30 ppm) then the dosing of reductant is increased, or if the feedback signal is above an upper boundary value (e.g. 100 ppm) then the dosing of reductant is decreased. The lower boundary value for the feedback signal should be at least equal to or greater than the threshold value for the tailpipe NOx signal.

Figure 6:
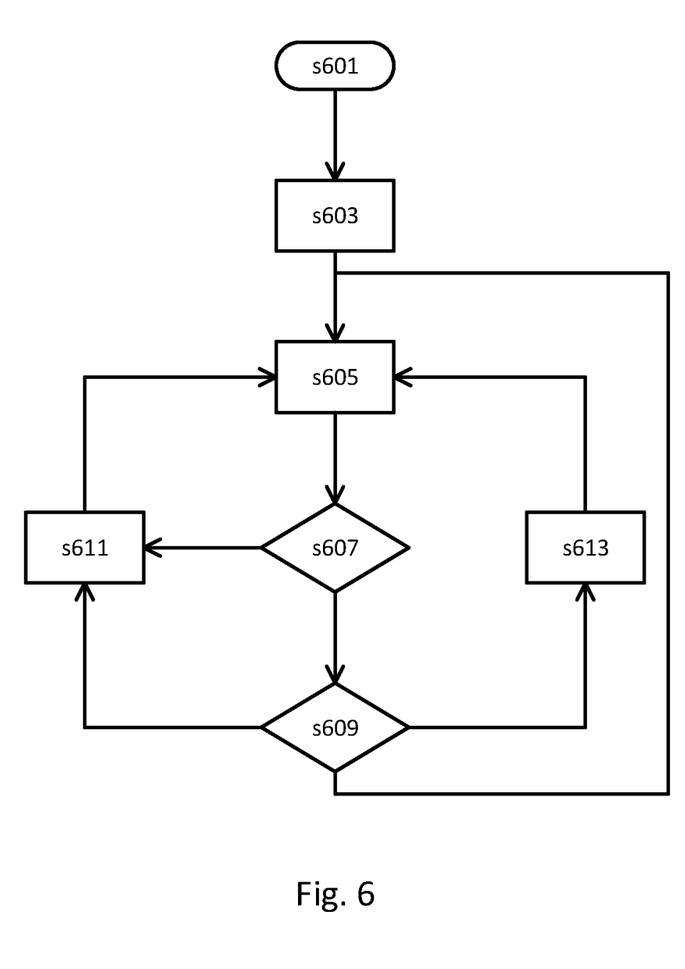
FIG. 6 is a flowchart schematically illustrating an exemplifying embodiment of a further method for controlling an exhaust gas aftertreatment system according to the invention.

FIG. 6 is a flowchart illustrating an exemplifying embodiment of this second method of controlling the exhaust gas aftertreatment system. Step s601 denotes the start of the method. In step s603 an initial dosing of reductant is dosed from the reductant dosing device 23. This initial dosing may be based on a signal from the initial NOx sensor 13, or may be determined in some other manner. In step s605 a feedback signal is obtained from the feedback NOx sensor 33 and a tailpipe NOx signal is obtained from the tailpipe NOx sensor 31. In step s607 the tailpipe NOx signal is compared with a threshold tailpipe NOx value. If the tailpipe NOx signal is greater than a threshold tailpipe NOx value then the dosing of reductant is increased (s611) and the method returns again to step s605 of obtaining the tailpipe and feedback signals. If the tailpipe NOx signal is less than the threshold tailpipe NOx value then the method proceeds to step s609. In step s609 the feedback signal is compared with a lower boundary value and an upper boundary value. If the feedback signal is below the lower boundary value then the dosing of reductant is increased (s611) and the method returns again to step s605 of obtaining the tailpipe and feedback signals. If the feedback signal is above the upper boundary value then the dosing of reductant is decreased (s613) and the method returns again to step s605 of obtaining the tailpipe and feedback signals. If the feedback signal is within the boundary values then the initial dosing is maintained and the method returns directly to step s605 of obtaining the tailpipe and feedback signals.

It is noted that during operation within the desired ANR interval, the feedback NOx sensor 33 is primarily measuring ammonia slip, and not NOx emission. Therefore, the feedback NOx sensor could in theory be replaced by an ammonium sensor. However, since ammonium sensors are expensive, less robust than NOx sensors, and have the same issues with regard to non-selectivity, it is preferred that a feedback NOx sensor is utilized.

During operation, the temperature of the exhaust aftertreatment system may fluctuate. The SCR catalyst is capable of storing an amount of ammonia, and this storage capacity is a function of temperature. During temperature transients, the amount of ammonia stored in the SCR catalyst may rapidly increase or decrease, leading to a transient deficit or peak of ammonia slip at the feedback NOx sensor 31. In order to account for such effects the signals from the NOx sensors, such as the signals from the feedback NOx sensor 33 and tailpipe NOx sensor 31, may be time-averaged. For example, the signals may be averaged over a period of from about 1 minute to about 20 minutes.

The invention claimed is:

1. A method for controlling an exhaust gas aftertreatment system, the exhaust gas aftertreatment system comprising: a reductant dosing device; a selective catalytic reduction, SCR, device arranged downstream of the reductant dosing device; an ammonia slip catalyst arranged downstream of the SCR device; a feedback NOx sensor arranged downstream of the SCR device and upstream of the ammonia slip catalyst; and a tailpipe NOx sensor arranged downstream of the ammonia slip catalyst,
wherein the method is performed by one or more control devices and comprises:
providing an initial dosing of reductant from the reductant dosing device;
obtaining a feedback signal from the feedback NOx sensor and a tailpipe NOx signal from the tailpipe NOx sensor; and
adjusting the dosing of reductant until the feedback signal exceeds the tailpipe NOx signal by a value within a predetermined positive interval.

2. The method according to claim 1, wherein dosing of reductant comprises:
determining a difference between the feedback signal and the tailpipe NOx signal;
comparing the determined difference with a lower boundary difference value and an upper boundary difference value; and
increasing the dosing of reductant if the determined difference is below the lower boundary difference value; or
decreasing the dosing of reductant if the determined difference is above the upper boundary difference value.

3. The method according to claim 1, wherein adjusting the dosing of reductant comprises:
comparing the tailpipe NOx signal with a threshold tailpipe NOx value, whereby if the tailpipe NOx signal is greater than a threshold tailpipe NOx value, then the dosing of reductant is increased in order to obtain a tailpipe NOx signal less than the threshold tailpipe NOx value;
once the tailpipe NOx signal is less than the threshold tailpipe NOx value, then comparing the feedback signal with a lower boundary value and an upper boundary value; and
increasing the dosing of reductant if the feedback signal is below the lower boundary value; or
decreasing the dosing of reductant if the feedback signal is above the upper boundary value.

4. The method according to claim 3, wherein the threshold tailpipe NOx value is equal to a detection limit of the tailpipe NOx sensor, or does not exceed the detection limit of the tailpipe NOx sensor by more than 10%.

5. The method according to claim 1, wherein the exhaust gas aftertreatment system further comprises an initial NOx sensor arranged upstream of the reductant dosing device, and wherein the initial dosing of reductant from the reductant dosing device is provided based on an initial NOx signal from the initial NOx sensor.

6. The method according to claim 1, wherein the exhaust gas aftertreatment system further comprises a temperature sensor and wherein the method is performed at a temperature of 150° C. or greater.

7. The method according to claim 1, comprising time averaging the tailpipe NOx signal and the feedback signal.

8. The method according to claim 1, wherein the exhaust gas aftertreatment system further comprises a temperature sensor and wherein the method is performed at a temperature of 180° C. or greater.

9. The method according to claim 1, wherein the ammonia slip catalyst has both ammonia slip catalyst and selective catalytic reduction functionality.

10. An exhaust gas aftertreatment system comprising:
a reductant dosing device;
a selective catalytic reduction, SCR, device arranged downstream of the reductant dosing device;
an ammonia slip catalyst arranged downstream of the SCR device;
a feedback NOx sensor arranged downstream of the SCR device and upstream of the ammonia slip catalyst;
a tailpipe NOx sensor arranged downstream of the ammonia slip catalyst; and at least one control device configured to:
provide an initial dosing of reductant from the reductant dosing device;
obtain a feedback signal from the feedback NOx sensor and a tailpipe NOx signal from the tailpipe NOx sensor; and
adjust the dosing of reductant until the feedback signal exceeds the tailpipe NOx signal by a value within a predetermined positive interval.

11. An exhaust gas aftertreatment system, comprising:
a reductant dosing device;
a selective catalytic reduction, SCR, device arranged downstream of the reductant dosing device;
an ammonia slip catalyst arranged downstream of the SCR device, wherein the ammonia slip catalyst has both ammonia slip catalyst and selective catalytic reduction functionality;
a feedback NOx sensor arranged downstream of the SCR device and upstream of the ammonia slip catalyst;
a tailpipe NOx sensor arranged downstream of the ammonia slip catalyst; and
at least one control device configured to:
provide an initial dosing of reductant from the reductant dosing device;
obtain a feedback signal from the feedback NOx sensor and a tailpipe NOx signal from the tailpipe NOx sensor; and
adjust the dosing of reductant until the feedback signal exceeds the tailpipe NOx signal by a value within a predetermined positive interval.

12. A vehicle comprising an exhaust gas aftertreatment system comprising:
a reductant dosing device;
a selective catalytic reduction, SCR, device arranged downstream of the reductant dosing device;
an ammonia slip catalyst arranged downstream of the SCR device;
a feedback NOx sensor arranged downstream of the SCR device and upstream of the ammonia slip catalyst;
a tailpipe NOx sensor arranged downstream of the ammonia slip catalyst; and
at least one control device configured to:
provide an initial dosing of reductant from the reductant dosing device;
obtain a feedback signal from the feedback NOx sensor and a tailpipe NOx signal from the tailpipe NOx sensor; and
adjust the dosing of reductant until the feedback signal exceeds the tailpipe NOx signal by a value within a predetermined positive interval.

13. The exhaust gas aftertreatment system according to claim 12, wherein the ammonia slip catalyst has both ammonia slip catalyst and selective catalytic reduction functionality.

* * * * *